Sept. 12, 1967 B. E. SEAR 3,341,715

HIGH SPEED DIGITAL CIRCUITS

Filed Oct. 28, 1964

INVENTOR
BRIAN E. SEAR
BY
Arthur Freilich
ATTORNEY 3,341,715

HIGH SPEED DIGITAL CIRCUITS

Brian E. Sear, Canoga Park, Los Angeles, Calif., assignor to The Bunker-Ramo Corporation, Stamford, Conn., a corporation of Delaware Filed Oct. 28, 1964, Ser. No. 407,084
13 Claims. (Cl. 307—88.5)

Figure 1:
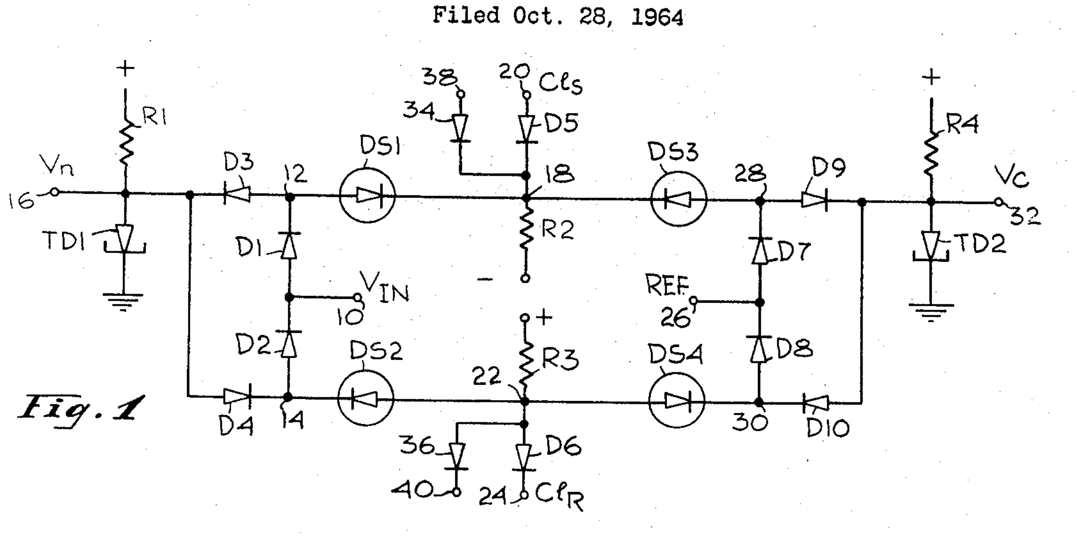

This invention relates generally to speed digital circuit arrangements.

Significant efforts has been expended in recent years in the development of very high speed switching circuits for use in digital computer, communication, and other type systems. This effort has recently lead to the development of circuits employing charge storage diodes and tunnel diodes in combination as disclosed by Brian E. Sear in his paper entitled "Novel Nanosecond Circuits Using Storage Diodes As Charge Transformers and Tunnel Diodes As Charge Amplifiers" delivered at the Western Electronics Show and Convention, August 20–23, 1963. It is pointed out therein that a considerable gain bandwidth product advantage over prior circuits can be obtained for nanosecond circuits by using a charge storage diode as a charge transformer in combination with a tunnel diode used as a charge amplifier. The paper goes on to disclose logic circuits and a preferred shift register circuit arrangement employing the charge storage diode and tunnel diodes in these capacities. More particularly, the shift register circuit embodiment taught in that paper generally makes use of a first phase clock source for resetting each shift register odd stage and for transferring information therefrom to the succeeding shift register even stage and a second phase clock source for resetting each shift register even stage and for transferring information therefrom to the succeeding shift register odd stage. In this respect it is like most known shift register circuits; i.e. information must usually be transferred from a first to a second stage prior to new information being brought into the first stage in order to prevent the information from being destroyed. Multiphase systems of this type can thus transfer information at the clock rate; i.e. one bit per clock cycle. This information transfer rate could be significantly increased however if the necessity of storing information in alternate stages could be avoided.

Thus, in a first embodiment of the present invention, a shift register stage is provided which avoids the necessity of storing information in alternate shift register stages by being simultaneously responsive to both set and reset clock pulses thereby permitting the formation of a shift register whose information transfer rate is substantially twice as great as prior known shift register circuits.

In accordance with a second embodiment of the present invention, a circuit arrangement is provided which employs a charge storage diode and a tunnel diode and can be used in place of conventional flip-flops or digital amplifiers.

Briefly, in accordance with the present invention a circircuit arrangement is provided including at least first and second charge storage diodes and at least one tunnel diode biased for bistable operation wherein said first and second storage diodes are respectively charged in response to first and second binary input signals and wherein said first storage diode, when charged, steers current in a direction to increase the flow in said tunnel diode in response to a clock pulse and wherein said second storage diode, when charged, steers current in a direction to decrease the flow in said tunnel diode in response to a clock pulse.

Thus, by applying a first binary input signal, the current flow in the tunnel diode is subsequently increased to switch it to its high voltage state and by applying a second binary input signal, the current flow in the tunnel diode is subsequently decreased to switch it back to its low voltage state. Accordingly, it can be seen that a circuit operating in this manner can be considered as a single phase circuit inasmuch as there is no requirement to provide a reset pulse between the application of sucessive set pulses. Circuits of this type generally which do not require that the circuit be returned to a reset or zero state, are often referred to as non-return-to-zero (NRZ) circuits.

Figure 2:
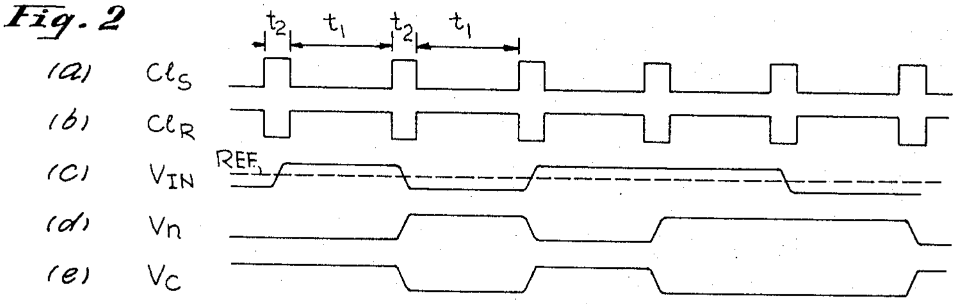
Figure 3:
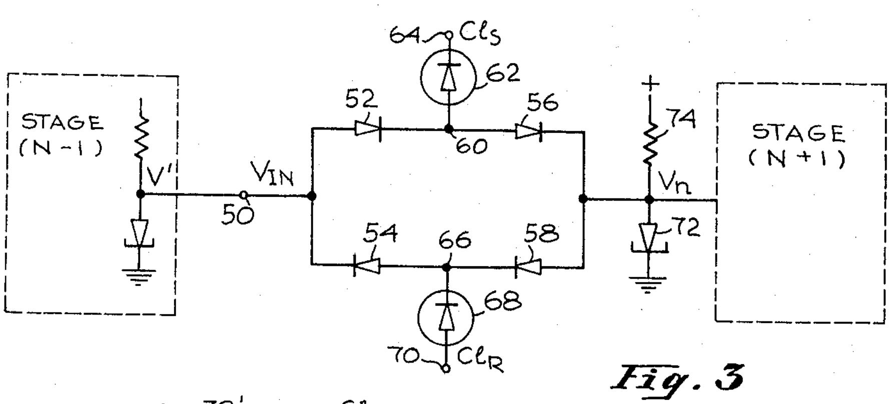
Figure 4:
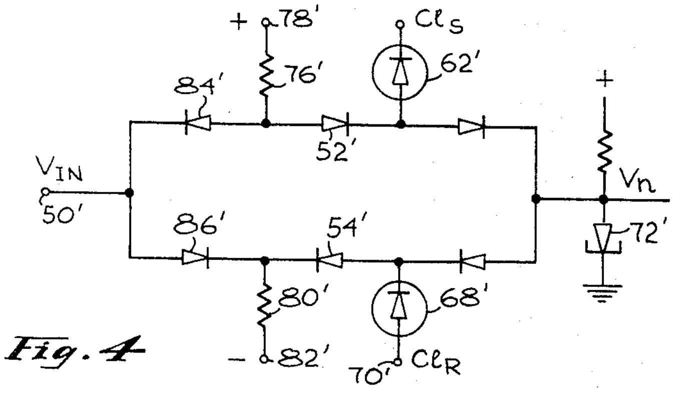

The novel features that are considered characteristic of this invention are set forth with particularity in the appended claims. The invention itself both as to its organization and method of operation as well as additional objects and advantages thereof, will best be understood from the following description when read in connection with the accompanying drawings, in which:

FIGURE 1 is a circuit diagram illustrating a first embodiment of the present invention which can be employed in conventional flip-flop applications;

FIG. 2 consists of a series of waveforms appearing at various points in the circuit of FIG. 1;

FIG. 3 is a circuit diagram of an alternate embodiment of the invention which finds significant utility as a shift register stage; and FIG. 4 is a circuit diagram of a still further embodiment of the invention which finds significant utility as a shift register stage.

Attention is now called to FIGURE 1 which illustrates a circuit arrangement finding utility in flip-flop, digital amplifier, and other applications. The circuit includes an input terminal 10 to which an input signal $V_{IN}$ is applied. Terminal 10 is connected to the anode and cathode respectively of conventional diodes D1 and D2. The cathode of diode D1 is connected to a junction 12 defined between the anode of a conventional diode D3 and the anode of a charge storage diode DS1. The anode of diode D2 is similarly connected to a juncture 14 defined between the cathode of a conventional diode D4 and a charge storage diode DS2. The cathode of diode D3 and the anode of diode D4 are connected to the anode of a tunnel diode TD1. The anode of tunnel diode TD1 is connected through a resistor R1 to a source of positive potential while the cathode thereof is connected to ground. An output terminal 16 on which appears a normal output signal $V_n$ is connected to the anode of tunnel diode TD1.

The cathode of charge storage diode DS1 is connected to the cathode of charge storage diode DS3. The junction 18 between the cathodes of diodes DS1 and DS3 is connected through a resistor R2 to a source of negative potential. Additionally, the junction 18 is connected to the cathode of a conventional diode D5 whose anode is connected to a clock input terminal 20.

Similarly, the anode of storage diode DS2 is connected to the anode of storage diode DS4. The junction 22 defined between the anodes of diodes DS2 and DS4 is connected through a resistor R3 to a source of positive potential. In addition, the junction 22 is connected to the anode of a conventional diode D6 whose cathode is connected to a second clock input terminal 24.

The anode of storage diode DS3 and the cathode of storage diode DS4 are respectively connected to the cathode and anode of conventional diodes D7 and D8. A terminal 26 is connected to the junction between the diodes D7 and D8. A reference voltage preferably midway between the two binary voltages adapted to be applied to the input terminal 10, is connected to the terminal 26.

Junction 28 between the anode of storage diode DS3 and the cathode of diode D7 is connected to the anode of diode D9 whose cathode is connected to the anode of tunnel diode TD2. Similarly, the junction 30 between the cathode and anode of diodes DS4 and D8 respectively is connected to the cathode of diode D10 whose anode is connected to the anode tunnel diode TD2. The anode of tunnel diode TD2 is connected through a resistor R4 to a source of positive potential and the cathode of tunnel diode TD2 is connected to ground. An output terminal 32, upon which a complementary output signal, $V_c$, appears, is connected to the anode of tunnel diode TD2.

Prior to considering the operation of the circuit of FIGURE 1, some brief comments will be made with respect to the operating characteristics of charge storage diodes and tunnel diodes. Much information exists in the literature with respect to the characteristics of these elements and more detailed information than will be set forth herein is included in the aforecited paper delivered at the Western Electronics Show and Convention.

The charge storage diode is characterized by its ability to conduct a current in a reverse direction therethrough when a reverse voltage is applied immediately after it has been conducting in a forward direction. More particularly, a charge storage diode, as a conventional diode, normally exhibits a very low forward impedance and a very high reverse impedance. The charge storage diode differs from conventional diodes however in that there is a recovery phase after forward conduction therethrough during which it presents a low backward impedance for a very short time thereby permitting a reverse current to flow whose amplitude is determined by the applied reverse voltage and the reverse loop impedance. The recovery phase lasts only long enough to permit the minority carriers within the diode to recombine. Prior to the minority carriers recombining, the diode can be considered as charged.

The tunnel diode is a device which can be operated in a bistable mode inasmuch as it has an S curve current voltage characteristic which permits a load line to be defined which intersects the characteristic at two stable points. In its first stable state, the tunnel diode draws a large current but defines a small voltage drop thereacross and in the second stable state, it draws a small current but defines a large voltage thereacross. In order to switch the tunnel diode from the first high current-low voltage state to the second low current-high voltage state, it is necessary to supply additional current to the tunnel diode to cause it to operate past the peak of its S curve characteristic. Once the peak has been passed, after the additional current has been removed, the tunnel diode will assume its second stable state. In order to return the tunnel diode to its first stable state, the current therein can be decreased until it is operating past the valley of its S curve characteristic. It will subsequently revert to its first stable state.

Let it be assumed that the input signal $V_{IN}$ can reside at either a positive or negative potential and let it further be assumed that the reference poential applied to terminal 26 is ground. Initially then consider the situation when signal $V_{IN}$ resides at a negative potential. A forward current will be conducted from resistor R3 through the storage diode DS2 and the conventional diode D2. Similarly, a forward current will be conducted from the terminal 26 through the diodes D7 and DS3 and through resistor R2. The storage diodes DS1 and DS4 will be back-biased and thus no appreciable current will flow therethrough. Accordingly, storage diodes DS2 and DS3 will be charged. Positive going clock pulses as shown in line A of FIGURE 2 are applied to clock input terminal 20 while negative going clock pulses, as shown in line B of FIGURE 2 are simultaneously applied to clock input terminal 24. The positive pulse on terminal 20 tends to back-bias both storage diodes DS1 and DS3. Inasmuch as storage diode DS3 is charged, a reverse current will be conducted therethrough which flows into the anode of tunnel diode TD2 thereby switching it to its second or high voltage state. The negative clock pulse applied to terminal 24 back-biases storage diodes DS2 and DS4 permitting a reverse current to flow through charged diode DS2 which current is supplied by resistor R1. Thus, the current through storage diode DS2 effectively is subtracted from the current flowing through the tunnel diode TD1 therefore causing the tunnel diode TD1 to switch to its first or low voltage state.

If the tunnel diode TD2 had been in its high voltage state previously or similarly if the tunnel diode TD1 had been in its low voltage state, then no switching would have occurred.

The duration of the clock pulses applied to the terminals 20 and 24 need only be sufficiently long to switch the tunnel diodes. Thus, this time, $t_2$, can be on the order of one-half nanoseconds or less. The interval $t_1$ between adjacent clock pulses need only be long enough to charge the storage diodes and could for example be two nanoseconds or less, giving rise to a switching rate of 400 megacycles or more.

If a positive binary signal is applied to input terminal 10, then forward currents would be conducted through storage diodes DS1 and DS4. The clock pulses subsequently applied to terminals 20 and 24 would then cause an increase in current through tunnel diode TD1 thereby switching it to its high voltage state and a decrease in current in tunnel diode TD2, thereby switching it to its low voltage state.

Line C of FIGURE 2 illustrates the waveform of an arbitrarily selected input signal $V_{IN}$ applied to terminal 10. Lines D and E of FIGURE 2 respectively illustrate the waveform of voltages appearing at the output terminals 16 and 32 of FIGURE 1. It will be noted that the signal $V_n$ appearing on output terminal 16 is identical to the input signal $V_{IN}$ except, however, it is delayed by one clock period. The signal $V_c$ appearing at output terminal 32 represents the complement of the signal $V_n$. Thus, the circuit of FIGURE 1 provides the normal and complementary outputs of a signal applied to the input thereof. The circuit is extremely useful as a digital amplifier inasmuch as current gain on the order of ten can be introduced.

It has thus far been assumed that the free running clock signals shown in lines A and B of FIGURE 2 are directly coupled through diodes D5 and D6 to the junctions 18 and 20. By incorporating simple clamp circuits comprised of diodes 34 and 36 respectively connected between control terminals 38 and 40 and the junctions 18 and 22, the storage diodes can be prevented from conducting in a forward direction and thus the positive and negative going clock pulses of lines A and B of FIGURE 2 will not drive reverse currents therethrough. More particularly, if a positive potential is applied to control terminal 38 and a negative potential to control terminal 40, all of the storage diodes will be back-biased regardless of the level of the input signal. Therefore, the current through the tunnel diode will be unaffected by changes in the input signal level and the circuit of FIGURE 1 will thus be able to hold a state for any duration.

Attention is now called to FIGURE 3 which illustrates a schematic diagram of a circuit employing the non-return-to-zero concept of the present invention and which can be utilized in a single phase shift register. The circuit of FIGURE 3 includes an input terminal 50 to which is applied an input signal $V_{IN}$ which can be taken from the output of a previous shift register stage. That, is assuming the schematic diagram to represent stage ($n$) of a shift register, the output of stage ($n-1$) is applied to terminal 50. Termial 50 is connected to the anode of a conventional diode 52 and to the cathode of a conventional diode 54. The cathode of diode 52 is connected to the anode of diode 56 and the anode of diode 54 is connected to the cathode of diode 58. Junction 60 connected between diodes 52 and 56 is connected to the anode of a storage diode 62. The cathode of storage diode 62 is connected to clock input terminal 64 to which are applied the clock pulses of line A of FIGURE 2. Junction 66 between diodes 54 and 58 is connected to the cathode of storage diode 68. The anode of diode 68 is connected to the clock terminal 70 to which are applied the clock pulses of line B of FIGURE 2. The cathode of diode 56 and the anode of diode 58 are connected to the anode of tunnel diode 72. The anode of tunnel diode 72 is connected through a resistor 74 to a source of positive potential and the cathode thereof is connected to ground. The anode of tunnel diode 72 provides a normal output signal which is connected to the input of a succeeding shift register stage ($n+1$).

In order to understand the operation of the circuit of FIGURE 3, initially assume that the input signal is at a high potential thereby driving a current through diode 52 and storage diode 62. Consequently, storage diode 62 will be charged and when a positive clock pulse is subsequently applied to terminal 64, a reverse current will be driven through storage diode 62 and conventional diode 56 into tunnel diode 72. Consequently, tunnel diode 72 will either be switched to or remain in its high voltage state. Thus, tunnel diode 72 will provide a high voltage input signal to stage ($n+1$). It should of course be appreciated that when the signal applied to input terminal 50 is high, diode 54 will be back-biased and consequently there will be no current flow through storage diode 68.

On the other hand however, when the input signal applied to terminal 50 is at a low level, a forward current will flow through storage diode 68 and conventional diode 54. No current will flow through storage diode 62. When the negative clock pulse is applied to terminal 70, a reverse current will be driven through storage diode 68 from resistor 74 thereby reducing the current in the tunnel diode 72 to cause the tunnel diode to either switch to or remain in its low voltage state.

Thus, during each interval $t_2$, as shown in lines A and B of FIGURE 2, the tunnel diode of each stage of the shift register will be driven to a state determined by the signal applied to the input terminal 50. It should be appreciated that there is no necessity of initially setting and then resetting each stage of the shift register inasmuch as the tunnel diode can be driven to either state depending upon the level of the input signal.

The forward current injected into the storage diodes 62 and 68 of FIGURE 3 is determined by the voltage difference between the input signal appearing at terminal 50 and the level of the clock signal appearing at terminal 64. As the rate at which the circuit is driven increases, it becomes more difficult to accurately control the voltage levels at the terminals 50 and 64 and thus of course the amount of charge injected into the storage diodes. Thus, at very high rates and in worse case situations, the reverse current driven through the storage diodes may be insufficient to properly switch the tunnel diode. In order to avoid this problem, the circuit of FIGURE 3 can be modified as shown in FIGURE 4 by the addition of a pair of constant current sources. More particularly, a resistor 76' is connected between the anode of diode 52' and a source of positive potential connected to terminal 78'. Similarly a resistor 80' is connected between the cathode of diode 54' and terminal 82' to which is connected a source of negative potential. Diodes 84' and 86' are respectively connected between the input terminal 50' and diodes 52' and 54'.

When the input signal $V_{IN}$ is positive, diode 84' will be back-biased and the constant current from resistor 76' will be driven in a forward direction through storage diode 62'. The constant current through resistor 80' will be driven through diode 86' and not through the storage diode 68'. Thus only storage diode 62' will be charged and thus the application of the clock pulses to terminals 64' and 70' will drive a current in the forward direction through tunnel diode 72' to shift it to its high voltage state.

From the foregoing, it should be apparent that binary circuit arrangements have been disclosed herein which can be operated at higher speeds than heretofore possible inasmuch as they need not be periodically reset or returned to a zero state but, in response to applied clock pulses, can be driven to either binary state dependent upon the applied input signal.

Although the preferred embodiments of the invention disclosed herein all utilize semiconductor charge storage diodes, the utilization of other elements is also possible. Thus, other elements which are characterized by being able to conduct in a reverse direction after conducting in a forward direction, such as certain transistors could be employed. Similarly, other bistable elements or circuits could be substituted for the tunnel diode. For example, there are circuits existing which exhibit the same S curve characteristic as the tunnel diode.

The embodiments of the invention in which are exclusive property or privilege is claimed are defined as follows:

1. A binary circuit arrangement including:
a tunnel diode biased for bistable operation;
first and second storage diodes;
means for initially driving a current in a forward direction through a selected one of said storage diodes;
means for subsequently simultaneously applying reverse potentials across said storage diodes to thus drive a reverse current through said selected storage diode; and
means coupling said first and second storage diodes to said tunnel diode for increasing the current through said tunnel diode in response to a reverse current through said first storage diode and for decreasing the current through said tunnel diode in response to a reverse current through said second storage diode.

2. A binary circuit arrangement including:
a tunnel diode biased for bistable operation;
first and second storage diodes;
an input terminal;
means for selectively applying first and second binary signals to said input terminal;
means responsive to the application of said first and second binary signals to said input terminal for respectively driving a current in a forward direction through said first and second storage diodes;
means for applying a reverse potential across the storage diode through which said forward current is driven to thus drive a reverse current therethrough; and
means coupling said first and second storage diodes to said tunnel diode for increasing the current through said tunnel diode in response to a reverse current through said first storage diode and for decreasing the current through said tunnel diode in response to a reverse current through said second storage diode.

3. The binary circuit arrangement of claim 2 including selectively actuatable means for isolating said storage diodes from said input terminal.

4. A binary circuit arrangement including:
a tunnel diode biased for bistable operation;

first and second storage diodes;

an input terminal;

means for selectively applying first and second binary signals to said input terminal;

means responsive to the application of said first and second binary signals to said input terminal for respectively driving a current in a forward direction through said first and second storage diodes;

means for simultaneously applying reverse potentials across said first and second storage diodes for driving a current in a reverse direction through the storage diode through which a forward current is being driven;

means coupling said first storage diode to said tunnel diode for increasing the current in said tunnel diode to cause it to define a second state in response to said reverse current through said first storage diode; and means coupling said second storage diode to said tunnel diode for decreasing the current in said tunnel diode to cause it to define a first state in response to said reverse current through said second storage diode.

5. The binary circuit arrangement of claim 4 including selectively actuatable clamp means for inhibiting said current from being driven in a forward direction through said storage diodes.

6. A binary circuit arrangement including:

first, second, third and fourth storage diodes;

first and second tunnel diodes each biased for bistable operation;

an input terminal;

means for selectively applying first and second binary input signals to said input terminal;

current source means responsive to said first binary input signal for driving currents in a forward direction through said first and fourth storage diodes and responsive to said second binary input signal for driving currents in a forward direction through said second and third storage diodes;

means simultaneously applying a reverse potential to each of said storage diodes to thereby drive a reverse current through those storage diodes conducting a forward current;

means coupling said first and second storage diodes to said first tunnel diode for respectively increasing and decreasing the current therein in response to reverse currents through said first and second storage diodes; and means coupling said third and fourth storage diodes to said second tunnel diode for respectively increasing and decreasing the current therein in response to reverse currents through said third and fourth storage diodes.

7. The circuit arrangement of claim 6 including a different conventional diode connected in series with and poled similarly to each of said storage diodes for conducting said forward current therethrough;

a first clock pulse input diode connected in series with and poled oppositely to said first and third storage diodes;

a second clock pulse input diode connected in series with and poled oppositely to said second and fourth storage diodes;

said means coupling each of said first and second storage diodes to said first tunnel diode including a different conventional diode coupled to each storage diode and poled to conduct said reverse current therethrough in a forward direction to the anode of said first tunnel diode;

said means coupling each of said third and fourth storage diodes to said second tunnel diode including a different conventional diode coupled to each storage diode and poled to conduct said reverse current therethrough in a forward direction to the anode of said second tunnel diode.

8. The binary circuit arrangement of claim 6 including selectively actuatable means for isolating said storage diodes from said input terminal.

9. A single phase shift register including a plurality of stages each of said stages including:

an input terminal;

an output terminal;

a first storage diode;

a second storage diode;

a tunnel diode;

means biasing said tunnel diode for bistable operation;

circuit means responsive to first and second binary input signals applied to said input terminal for respectively charging said first and second storage diodes by driving a current in a forward direction therethrough;

first and second sources of recurring first and second opposite polarity clock pulses;

means respectively applying said first and second clock pulses to said first and second storage diodes for driving a reverse current through said charged storage diode;

means respectively responsive to reverse currents through said first and second storage diodes for switching said tunnel diode to first and second states; and means connecting said output terminal to said tunnel diode.

10. The shift register of claim 9 including a first conventional diode connected in series between said input terminal and said first storage diode and poled similarly thereto;

a second conventional diode connected in series between said input terminal and said second storage diode and poled similarly thereto;

a third conventional diode connected in series between said output terminal and said first storage diode and poled oppositely thereto; and a fourth conventional diode connected in series between said output terminal and said second storage diode and poled oppositely thereto.

11. The shift register stage of claim 9 including selectively actuatable means for isolating said storage diodes from said input terminal.

12. A binary circuit arrangement including:

a tunnel diode biased for bistable operation;

first and second storage diodes;

an input terminal;

means for selectively applying first and second binary signals to said input terminal;

source means providing first and second constant currents;

means responsive to the application of said first and second binary signals to said input terminal for respectively driving said first and second constant currents in a forward direction through said first and second storage diodes;

means for simultaneously applying reverse potentials across said first and second storage diodes for driving a current in a reverse direction through the storaged diode through which a forward current is being driven;

means coupling said first storage diode to said tunnel diode for increasing the current in said tunnel diode to cause it to define a second state in response to said reverse current through said first storage diode; and means coupling said second storage diode to said tunnel diode for decreasing the current in said tunnel diode to cause it to define a first state in response to said reverse current through said second storage diode.

13. A binary circuit arrangement including:

a bistable circuit means;

first and second storage elements;

means for initially driving a current in a forward direction through a selected one of said storage elements;

means for subsequently simultaneously applying reverse potentials across said storage elements to thus drive a reverse current through said selected storage element; and means coupling said first and second storage elements to said bistable circuit means for switching said circuit means to a first state by increasing the current therethrough in response to a reverse current through said first storage element and for switching said circuit means to a second state by decreasing the current therethrough in response to a reverse current through said second storage element.

References Cited

UNITED STATES PATENTS

| | | | |
|---|---|---|---|
| 3,205,376 | 9/1965 | Berry et al. | 307—88.5 |
| 3,214,611 | 10/1965 | Chow | 307—88.5 |
| 3,225,220 | 12/1965 | Cubert | 307—88.5 |
| 3,244,908 | 4/1966 | LoCasale et al. | 307—88.5 |

ARTHUR GAUSS, *Primary Examiner.*

J. S. HEYMAN, *Assistant Examiner.*